(12) United States Patent
Shakkarwar

(10) Patent No.: US 10,755,268 B2
(45) Date of Patent: Aug. 25, 2020

(54) APPARATUS AND METHODS FOR PAYMENT TRANSACTIONS USING NEAR FIELD COMMUNICATION

(71) Applicant: VERIENT INC., San Jose, CA (US)

(72) Inventor: Rajesh G. Shakkarwar, Cupertino, CA (US)

(73) Assignee: VERIENT, INC., San Jose, CA (US)

( * ) Notice: Subject to any disclaimer, the term of this patent is extended or adjusted under 35 U.S.C. 154(b) by 1543 days.

(21) Appl. No.: 13/651,219

(22) Filed: Oct. 12, 2012

(65) Prior Publication Data

US 2013/0132282 A1    May 23, 2013

Related U.S. Application Data

(63) Continuation-in-part of application No. 12/118,647, filed on May 9, 2008, now abandoned.

(60) Provisional application No. 61/546,948, filed on Oct. 13, 2011.

(51) Int. Cl.
*G06Q 20/38* (2012.01)
*H04B 5/00* (2006.01)
*G06Q 20/32* (2012.01)
*G06Q 20/34* (2012.01)
*G06Q 20/40* (2012.01)

(52) U.S. Cl.
CPC ....... *G06Q 20/382* (2013.01); *G06Q 20/3278* (2013.01); *G06Q 20/352* (2013.01); *G06Q 20/35785* (2013.01); *G06Q 20/405* (2013.01); *H04B 5/0031* (2013.01)

(58) Field of Classification Search
CPC ........................................................ G06Q 20/38
USPC .......................................................... 705/35
See application file for complete search history.

(56) References Cited

U.S. PATENT DOCUMENTS

| | | | |
|---|---|---|---|
| 2007/0038516 A1* | 2/2007 | Apple et al. | 705/14 |
| 2009/0271276 A1* | 10/2009 | Roberts | 705/16 |
| 2009/0281951 A1 | 11/2009 | Shakkarwar | |
| 2010/0023449 A1 | 1/2010 | Skowronek et al. | |
| 2010/0051685 A1 | 3/2010 | Royyuru et al. | |
| 2010/0217709 A1 | 8/2010 | Aabye et al. | |
| 2012/0215694 A1* | 8/2012 | Vilmos | 705/44 |

(Continued)

FOREIGN PATENT DOCUMENTS

| | | |
|---|---|---|
| WO | 2005/093643 A1 | 10/2005 |
| WO | 2008104704 A1 | 9/2008 |

OTHER PUBLICATIONS

European Search Report Application No. 12188576.8 dated Nov. 6, 2013.

*Primary Examiner* — Lindsay M Maguire
(74) *Attorney, Agent, or Firm* — Artegis Law Group, LLP

(57) ABSTRACT

In one embodiment, a mobile device includes an NFC tag for near field communication. The NFC tag may include a first storage device and a second storage device. Personal data is stored on the first storage device, which is not accessible by a NFC reader device. Prior to a transaction, the personal data is transmitted from the first storage device to the second storage device, where the data is readable or accessible by the reader device. After transmission of the data to the reader device, the data on the second storage is erased. In one embodiment, the data remains stored in the first storage device and available for future use. In another embodiment, the data comprises financial product data.

14 Claims, 12 Drawing Sheets

(56) References Cited

U.S. PATENT DOCUMENTS

2013/0132282 A1\* 5/2013 Shakkarwar .................... 705/64

\* cited by examiner

APPARATUS AND METHODS FOR PAYMENT TRANSACTIONS USING NEAR FIELD COMMUNICATION

BACKGROUND OF THE INVENTION

Field of the Invention

Embodiments of the present invention relate to making payments using a near field communication device. In one aspect, embodiments of the present invention relate to preventing eavesdropping of near field communication.

Description of the Related Art

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow users to send and receive electronic mail (email) messages wirelessly and access the internet via a cellular network and/or a wireless local area network (WLAN), for example.

Some mobile devices incorporate contactless card technology and/or Near Field Communication ("NFC") chips. Near Field Communications technology is commonly used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing. This short-range high frequency wireless communications technology exchanges data between devices over a short distance, such as only a few centimeters.

Personal data is stored on the NFC chip embedded in the mobile device. The stored data may be read by a reader when the mobile device is placed in close proximity to the reader. Electromagnetic energy emitted from the reader may power on and automatically transmit the stored data to the reader.

A potential problem exists with near field communications due to eavesdropping. Because the stored data is automatically transmitted, an attacker may obtain the stored data from the NFC chip using an unauthorized reader. There is, therefore, a need for apparatus and methods of preventing eavesdropping of data from the NFC chip.

Theft of credit/debit/prepaid card numbers from merchant repository is a problem in the industry. It would be desirable to allow customers to pay for goods and services to merchants without exposing their card number to the merchant. There is a need therefore, for apparatus and methods of making financial transactions without exposing the real card number.

SUMMARY OF THE INVENTION

In one embodiment, a method of transmitting data from a mobile device equipped with a NFC tag to a reader device includes storing data in a first storage device; transmitting data from first storage device to a second storage device; activating the NFC tag in response to an electromagnetic signal from the reader device; transmitting the data from the second storage device to the reader device; and removing the data from second storage device.

In another embodiment, a near field communication tag for use with a reader device includes a first storage device for storing data; a second storage device; and a controller coupled to the first storage device and the second storage device, the controller configured to transmit data from the first storage device to the second storage device; and transmit data from the second storage device to the reader device. In one embodiment, the tag also includes a transmitter for receiving an electromagnetic energy from the reader device. In another embodiment, the second storage device is activatable by the electromagnetic energy.

In another embodiment, a method of transmitting data from a payment device equipped with a NFC tag to a reader device includes storing a financial product in a first storage device; transmitting the financial product from first storage device to a second storage device; activating the NFC tag in response to an electromagnetic signal from the reader device; transmitting the financial product from the second storage device to the reader device; and removing the financial product from second storage device. In another embodiment, the financial product is funded by one or more core accounts.

In another embodiment, a method of transmitting a financial product data from a NFC enabled device to a reader device includes receiving the financial product data; storing the financial product data in a storage device; and transmitting the financial product data from the storage device to the reader device. In yet another embodiment, the financial product data is a single use financial product data. In yet another embodiment, after transmitting the financial product data, receiving a second financial data, and storing the second financial data in the storage device. In yet another embodiment, the financial product data is received each time the NFC enabled device is activated. In yet another embodiment, the method includes storing a plurality of financial product data on the storage device.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relates to apparatus and methods for near field communication of a device. In one embodiment, the device includes an NFC tag for near field communication. The NFC tag may include a first storage device and a second storage device. Personal data is stored on the first storage device, which is not accessible by a NFC reader device. Prior to a transaction, the personal data is transmitted from the first storage device to the second storage device, where the data is readable or accessible by the reader device. After transmission of the data to the reader device, the data on the second storage is removed. In this respect, the data is not available for eavesdropping by an unauthorized reader device. In addition, the data remains stored in the first storage device and available for future use. In one or more embodiments described herein, the device is a mobile device.

In another embodiment, the payment device includes an NFC tag for near field communication. The NFC tag may include a first storage device and a second storage device. A child product data is stored on the first storage device, which is not accessible by a NFC reader device. Prior to a transaction, the child product data is transmitted from the first storage device to the second storage device, where the child product data is readable or accessible by the reader device. After transmission of the data to the reader device, the child product data on the second storage is removed. In this respect, the child product data is not available for eavesdropping by an unauthorized reader device. In addition, the child product data remains stored in the first storage device and available for future use.

In another embodiment, a method of transmitting a financial product data from a NFC enabled device to a reader device includes receiving the financial product data; storing the financial product data in a storage device; and transmitting the financial product data from the storage device to the reader device. In yet another embodiment, the financial product data is a single use financial product data. In yet another embodiment, after transmitting the financial product data, receiving a second financial data, and storing the second financial data in the storage device. In yet another embodiment, the financial product data is received each time the NFC enabled device is activated. In yet another embodiment, the method includes storing a plurality of financial product data on the storage device.

Figure 1:
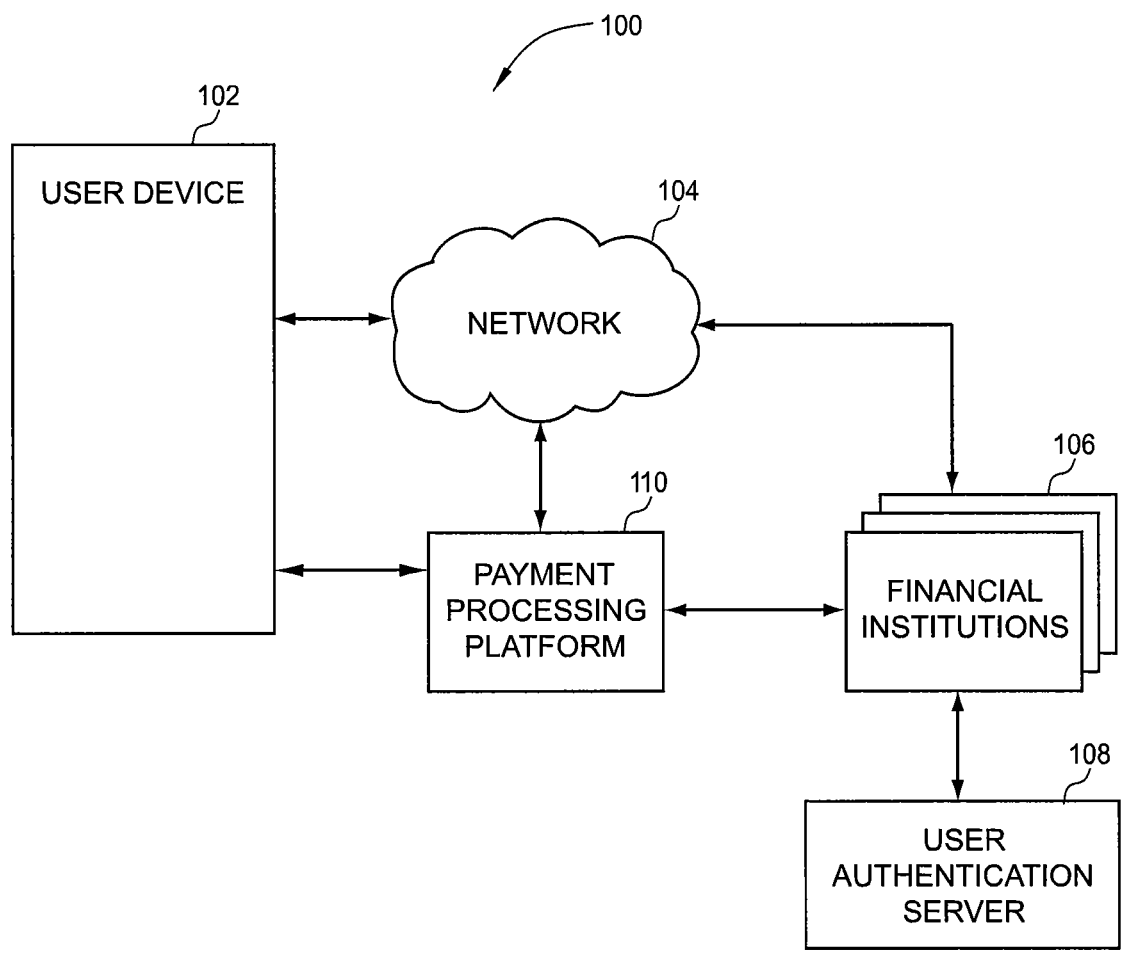
FIG. 1 is a block diagram illustrating components of a system configured to implement one or more aspects of the invention.

FIG. 1 is a block diagram illustrating components of a system 100 configured to implement one or more aspects of the invention. As shown, the system 100 includes a user device 102, a network 104, one or more financial institutions 106, a user authentication server 108, and a payment processing platform 110.

The user device 102 may be any type of individual computing device such as, for example, a desktop computer, a laptop computer, a hand-held mobile device, a personal digital assistant, or other portable devices equipped with electronics, such as a credit card embedded with electronics. Alternatively, the user device 102 may be any other device, such as a standard telephone, or an ATM terminal for a financial institution, or a terminal used by a customer representative at a financial institution, or the like. In one embodiment, the user device 102 is configured to be in communication with the other components in the system 100 via the network 104. The network 104 may be any type of data network, such as a local area network (LAN), a wide area network (WAN), cellular communications network, the Internet, a voice network such as a standard telephone network, or combinations thereof.

As is described in greater detail below, in some embodiments of the invention, a user may generate a "child product" that is linked to one or more "core accounts" held with one or more financial institutions 106. As used herein, the term "financial institution" also applies to an issuer processor who processes transactions on behalf of a financial institution. In various embodiments, the one or more core accounts may be standard accounts held with the financial institutions 106, including a checking account, a savings account, a home equity line of credit, a money market account, a credit card account, a debit card account, a prepaid card account, a gift card account, a healthcare savings account, an educational savings account, an employee benefits account, a promotion fund account, a rewards account (e.g., mileage or rewards points) or the like. In other embodiments, the core account may be associated with any type of billed account, including a utility bill account, cable account, satellite television account, phone service account, cell phone account, or the like. In one embodiment, the child product may be the same account as the core account. The child product may be used to make payment transactions and the payment transactions may be processed as if the payment transactions were made using the one or more core accounts. For example, a child product that is linked to both a checking core account and a credit card core account is processed by the financial institution legacy systems of each respective core account. Additionally, the child product may be used to deliver promotional coupons and/or to pay a salary of employees. In other use examples, the child product may be used to make an accounts payable transaction. In further embodiments, control parameters may be added to the child product, restricting the usage of the child product, as described in greater detail below. A child product may also be referred to herein as a financial product.

In one embodiment, when a user wishes to generate the child product, the user may direct the user device 102 to navigate to a webpage of the one or more financial institutions 106. In another embodiment, the user may use an ATM terminal at a financial institution to generate the child product. In yet another embodiment, the user may request the generation of a child product through a customer service representative at a branch location of a financial institution. In yet another embodiment, the user may request the generation of a child product through a customer service representative at a customer support call center of the financial institution. In still further embodiments, the user may request the generation of the child product directly from the payment processing platform 110. In still further embodiments, the user may request generation of the child product via short message service (SMS) message, email message, or by phone via IVR (interactive voice recognition). In still further embodiments, the user device 102 may request the generation of the child product directly from the payment processing platform 110 or the financial institution through an application program interface "API".

The user may need to authenticate with the one or more financial institutions 106 before the child product is generated. In one embodiment, authentication includes the user being prompted to enter a username and/or password. In alternate embodiments, the user may be prompted to swipe an ATM card and enter a PIN number to authenticate. In yet additional embodiments, the user may be asked to show a driver's license or a government-issued photo identification to authenticate with the one or more financial institutions 106. In still further embodiments, the user may place a telephone call to the customer service phone number of the one or more financial institutions. Authentication may involve the user being asked questions to verify the identity of the user. In alternative embodiments, a third-party other than the financial institutions, may offer the ability to generate child products. In yet another embodiment, the user device 102 may authenticate with the payment processing platform 110 or the financial institution through an API, for example, by sending username/password or a certificate.

In still further embodiments, one or more control parameters are applied to the core account held with the one or more financial institutions 106. In these embodiments, a child product may or may not be generated.

Figure 2:
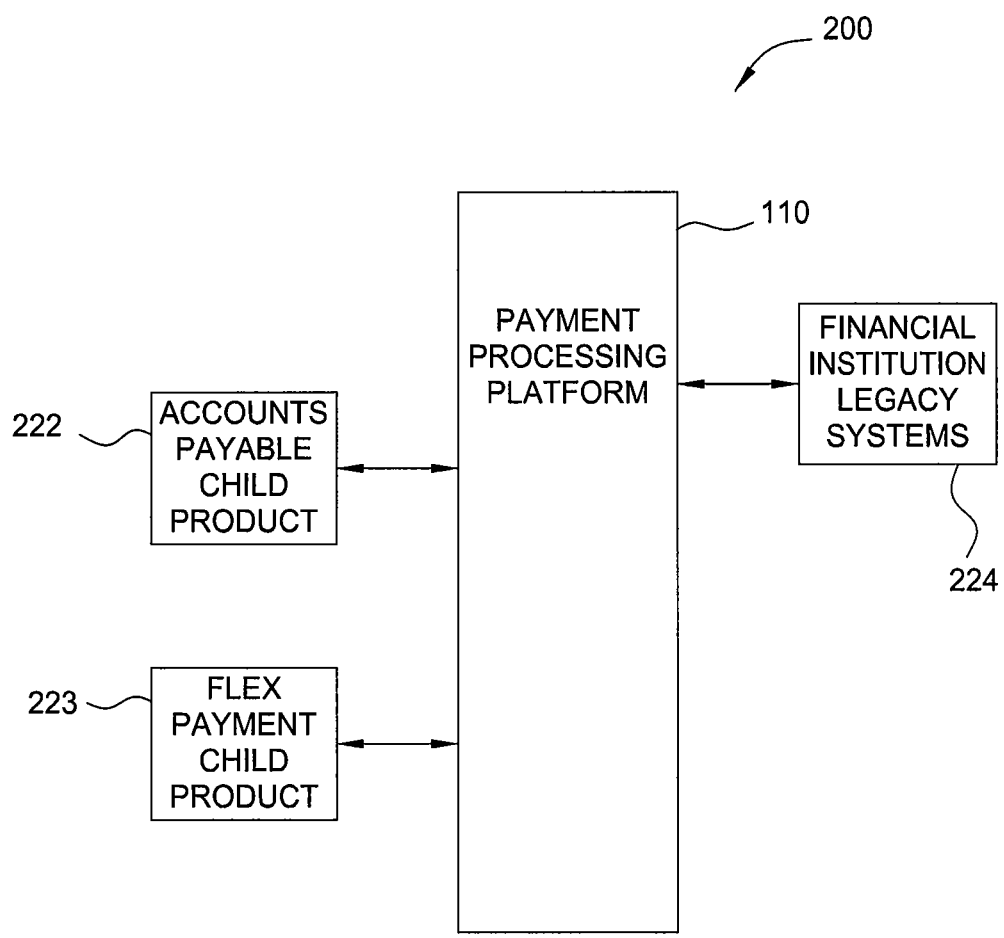
FIG. 2 is a conceptual illustration of a system including a payment processing platform, according to one embodiment of the invention.

FIG. 2 is a conceptual illustration of a system 200 including a payment processing platform 110, according to one embodiment of the invention. As shown, the payment processing platform 110 serves as a processor between various child products, such as an accounts payable child product 222 and a flex payment child product 223, and financial institution legacy systems 224. However, in other embodiments, the payment processing platform 110 may reside between any number of financial systems.

The accounts payable child product 222 may be generated by a payor business and transmitted to a payee business as a form of payment. For example, a payor business may receive a bill for $10,000.00 for goods or services rendered by a payee business. The payor business may then cause an accounts payable child product 222 to be generated by the payment processing platform 110 with control parameters limiting the accounts payable child product 222 to a single transaction with a maximum transaction amount of $10,000.00. The accounts payable child product 222 is then delivered to the payee business, whereupon the payee business redeems the accounts payable child product 222. Redemption of the accounts payable child product 222 may occur through an ATM terminal, a commercial bank branch location, a check-cashing location, transfer of funds from an account held by the payor to an account held by the payee, or any other mechanism. Upon redemption, $10,000.00 is transferred from a financial institution of the payor business to a financial institution of the payee business. In some embodiments, additional control parameters can be added to the accounts payable child product 222, such as an expiration date or a particular geographical region that limits the boundaries of redemption. These additional control parameters allow for enhanced security and efficiency of the transaction between the payor business and the payee business.

The flex payment child product 223 may be generated by a user and used for a payment transaction at a merchant. In another embodiment, the flex payment child product 223 may be generated (i.e., issued directly) by a financial institution 106. For example, the flex payment child product 223 may be associated with a credit card product issued directly by the financial institution 106. In one embodiment, a payment transaction initiated with the flex payment child product 223 is processed as a credit card transaction, where the funds may be withdrawn from another account. For example, after the purchase transaction is processed as a credit card transaction, the user may subsequently choose, on a per transaction basis, to charge the purchased amount to a credit card account or to debit the purchase amount from another core account such as a checking account. In this respect, the flex payment child product 223 offers both a credit card functionality and a debit card functionality. In one embodiment, the child product may be the same account as the core account. For example the flex payment child product 223 may have the same credit card number as the credit card number assigned by the financial institution that is providing the financial backing for the child product.

Figure 3:
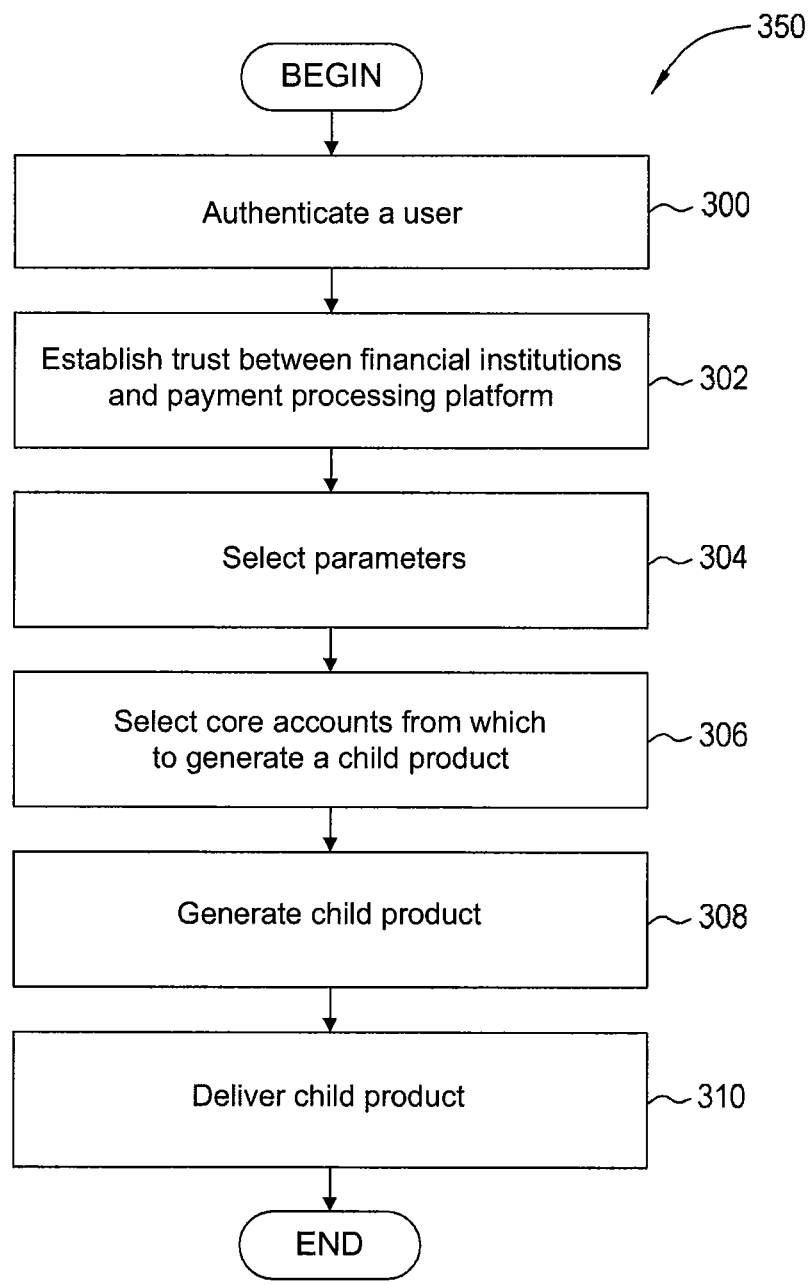
FIG. 3 is a flow diagram of method steps for generating a child product, according to one embodiment of the invention.

FIG. 3 is a flow diagram of method steps for generating a child product, according to one embodiment of the invention. Persons skilled in the art will understand that, even though the method 350 is described in conjunction with the systems of FIGS. 1 and 2, any system configured to perform the steps of the method 350 illustrated in FIG. 3, in any order, is within the scope of the invention. Persons skilled in art will further understand that one more of the steps of method 350 is optional.

As shown, the method 350 begins at step 300, where a user and/or user device 102 is authenticated. In one embodiment, the user may be authenticated by entering a username and password into a log-on screen of a financial institution website. In yet another embodiment, the user device 102 may authenticate with the payment processing platform 110 or the financial institution through an API such as by sending a username/password or a certificate. In alternative embodiments, a third-party other than a financial institution may offer the ability to generate child products. In these embodiments, the user may be authenticated by entering a username and password into a log-on screen of the third-party website.

In alternate embodiments, the user may be prompted to swipe an ATM card and enter a PIN number to authenticate. In yet additional embodiments, the user may be asked to show a driver's license or a government-issued photo identification to authenticate with the one or more financial institutions 106. In still further embodiments, the user may place a telephone call to the financial institution customer service phone number to generate a child product. Authentication may involve the user being asked questions to verify the identity of the user. For example, the user may be asked to verify a social security number and/or mother's maiden name. In yet other embodiments, the user may be authenticated using biometric characteristics. In still further embodiments, a user may be authenticated by a phone number used in sending an SMS or performing a voice call via a service provider, with or without a PIN number being provided.

Once the user is properly authenticated, the method 350 proceeds to step 302, where a trust is established between the one or more financial institutions 106 and the payment processing platform 110. In another embodiment, at step 302, a trust is established between a third party, other than a financial institution, that may be responsible for authentication and the payment processing platform 110.

At step 304, the parameters for use of the child product are optionally selected. In one embodiment, control parameters include a series of restrictions on transactions made with the child product. For example, the control parameters may include, but are not limited to, a card spending limit, a per-transaction spending limit, a daily spending limit, a weekly spending limit, a limit on number of transactions in a given period of time, a name on card, an activation date, an expiration date, a country of use, a merchant of use, a merchant category, a time of day, a day of week, a date of month, a merchant channel (online, point-of-sale), a reset frequency for reset-able cards, a geographical region for valid redemption, and the like. Also, other types of parameters including rules parameter, split tender parameter, and spillover parameters, may be selected at step 304. The rules parameter, split tender parameter, and spillover parameters will be discussed in more detail below. In another embodiment, one or more parameters may be set as a default parameter by an issuer.

When a child product is attempted to be used in a transaction, the transaction details may be checked against the control parameters stored for the child product. In one embodiment, if at least one of the control parameters is not satisfied, then the transaction is rejected. If each of the control parameters satisfy those stored for the child product, the transaction proceeds to processing, as described in greater detail below in FIGS. 6 and 7. In alternative embodiments, if a minimum number of control parameters are satisfied, then the transaction is approved. For example, a child product may include five control parameters and a transaction is approved if four out of five control parameters are satisfied. In still further embodiments, control parameters may be assigned "weights" such that a transaction is approved if the sum of the weights assigned to the satisfied control parameters exceeds a minimum value. For example, a per-transaction limit control parameter may be assigned a weight of five, a merchant category control parameter may be assigned a weight of four, a merchant name parameter may be assigned a weight of three, and all other control parameters may be assigned a weight of two. In this example, a transaction may be approved if the sum of the satisfied control parameters exceeds ten. As will be understood by those having ordinary skill in the art, other techniques for comparing the transaction details against the control parameters stored for the child product may be available.

Referring back to FIG. 3, at step 306, one or more core accounts are selected from which to generate a child product. In one embodiment, the one or more core accounts may be any type of financial account held with one or more financial institutions. For example, the core accounts may include a checking, savings, home equity, credit card account, or the like. When a child product is generated from one or more core accounts, any transactions made using the child product are processed as though the transaction was made using the one or more core accounts, as is described in greater detail below.

Figure 4:
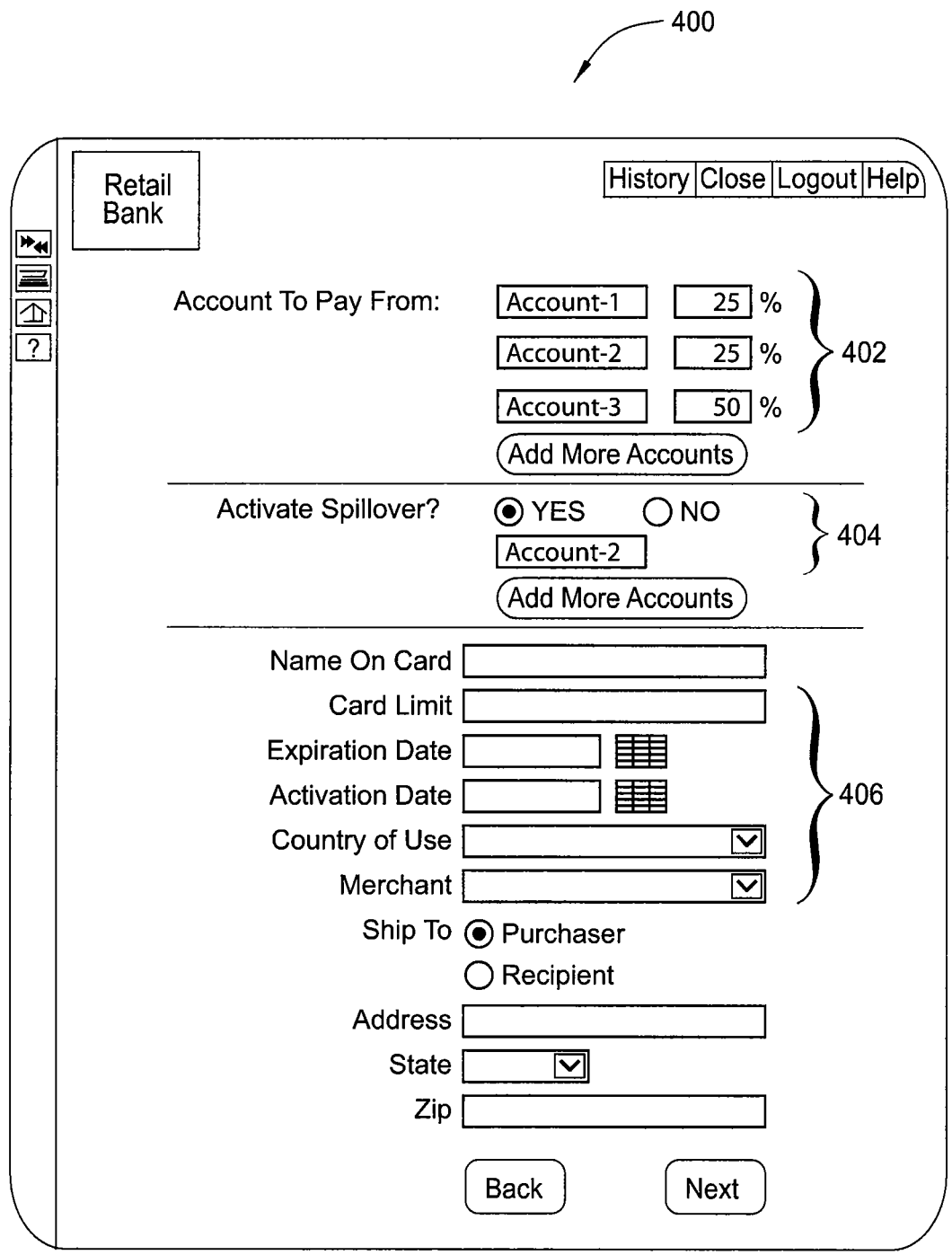
FIG. 4 is a screen shot illustrating selection of various parameters for a child product, according to one embodiment of the invention.

FIG. 4 is a screen shot 400 illustrating selection of various parameters for a child product, according to one embodiment of the invention. As shown, an interface allows a user to select one or more core accounts 402, a spillover feature 404, and control parameters 406 for the child product. In one embodiment, the selection of the one or more core accounts 402 may be included in a single screen along with the selection of spillover activation 404 and the selection of the control parameters 406. As shown, the selection of core accounts 402 allows for the child product to be linked to multiple core accounts, where each selected core account contributes a particular percentage of the total funds required to complete each transaction initiated using the child product. In other embodiments, each of the plurality of core accounts may be associated with a maximum amount to be withdrawn or debited in one child transaction. In addition, the parameters may include rules (not shown) which cause particular types of transactions to withdraw all funds for that transaction from a particular type of account. For example, the user may configure a child product to, when purchasing airline tickets, withdrawal the funds only from a credit-card account. In another example, a rule may be established to withdraw funds from a checking account when a purchase is less than $50.

In some embodiments, the selection of spillover activation 404 allows for the child product to be protected from overdrawing from one or more of the core accounts associated with the child product. In some embodiments, the selection of the control parameters 406 includes selection of card limit, expiration date, activation date, country of use, and/or merchant of use. As one having ordinary skill in the art will appreciate, additional control parameters may be selected for the child product, including merchant category (e.g., "restaurants"). For convenience, each child card may be given a name to remind a user of the purpose of a child card. Additional details regarding linking the child product to multiple core accounts and activating the spillover feature are described in greater detail below. Additionally, the child product may be configured to allow for split tender transactions. As shown in FIG. 4, the child product is associated with three core accounts—Account-1, Account-2, and Account-3. When the child product is used in a payment transaction, 25% of the cost will be deducted from Account-1, 25% of the cost will be deducted from Account-2, and 50% of the cost will be deducted from Account-3. These percentages can be configurable at the time the child product is generated or modified at a later time. Additionally, in other embodiments, each of the plurality of core accounts is associated with a maximum amount of funds to be withdrawn for a single core account transaction. Again, the maximum values for each core account are configurable at the time the child product is generated or modified at a later time. It is contemplated that any child product may be configured with at least one of a control parameter, rules parameter, spillover parameter, split tender parameter, and combinations thereof. For example, the child product may be configured with a parameter only for handling spillovers. In another example, the child product may be configured with parameters for the control parameters and the rules parameters. Configuration of these parameters can be done using any technically feasible mechanism, including via a webpage, email or SMS message, IVR, or any other technique. In one embodiment, a set of parameters may be pre-selected and saved for use as a parameter template for generating a child product. In another embodiment, multiple parameter templates may be created and offered as options for creating a child product. In yet another embodiment, the child product may be pre-configured with a default set of parameters.

Referring back to FIG. 3, at step 308, a child product is generated. In one embodiment, the child product is generated having a 16-digit card number, a card identification value, an expiration date, and a name on card. As is known, a card number includes a Bank Identification Number or BIN number. The BIN number is generally a one- to six-digit number that identifies the financial institution that issued the credit/debit card. In one embodiment of the invention, the child product generated at step 308 includes a BIN number that identifies that the child product as being issued by the payment processing platform 110. In alternative embodiments, the generated child card may include a BIN number within a range that identifies that the child product is associated with a particular financial institution, but is nevertheless a child product. In still further embodiments, depending on the categories of the selected core accounts, the financial institution may request that the payment processing platform issue a child product of a particular type. For example, if the user selects a credit card account as the core account, then the generated child product may include a BIN number that identifies that child card as being a credit card that is processed through a particular card network. In yet another embodiment, the child product may be the same account as one of the core accounts. For example, the child product may have the same 16-digit card number value, card identification value, and expiration date value as one of the core accounts.

Figure 5:
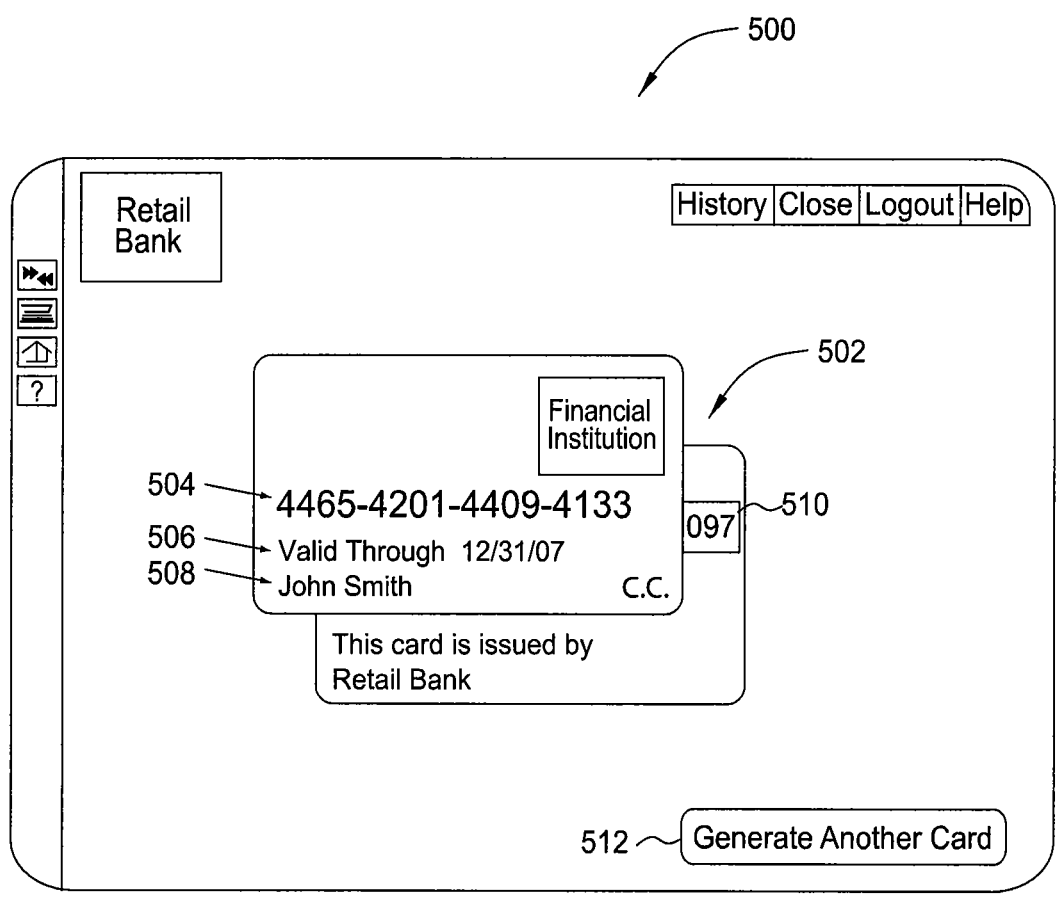
FIG. 5 is a screen shot illustrating a generated child product, according to one embodiment of the invention.

FIG. 5 is a screen shot 500 illustrating a generated child product 502, according to one embodiment of the invention. As shown, the child product 502 includes a card number 504, expiration date 506, name 508, and card identification value 510. As described above, a physical card may be requested and mailed to the address input when generating the child product 502. Alternatively, the child product 502 may be delivered electronically as a virtual card, or the child product 502 may be delivered both physically and electronically. In one another embodiment, the child product may be delivered to the user device 102 for transmission to the NFC reader.

Referring back to FIG. 3, at step 310 the child product is delivered. In one embodiment, the child product may be a physical card that is mailed to the customer or to the recipient. In alternative embodiments, the child product may be a virtual card that is available to the customer/recipient through a web browser. Alternatively, the child product may be a virtual card that is e-mailed to the customer/recipient, sent using a SMS, sent using any electronics medium, or delivered over the phone. A virtual card is a payment method for which a non physical manifestation of child card is generated. In some embodiments, a physical manifestation is also generated in addition to the non-physical virtual card. A user may create a virtual card as a virtual credit or debit card, having a seemingly "normal" credit/debit card number, which can be used by the customer for card-not-present transactions such as online transaction, or mail-order telephone orders (MOTO) transactions. In alternative embodiments, a virtual card may be generated and the card number may be associated with the contactless payment options enabled by a mobile device such as a radio-frequency identification (RFID) tag of a mobile device to allow a customer to make contactless payments at a point-of-sale location. In further embodiments, a virtual card may be generated and the customer may print out an image of the virtual card child product, optionally including other identifying information such as a bar code, and take the print-out to a merchant location as a form of payment. In one embodiment, the card identification value is a Card Verification Value, like CVV, CVV2, PIN number, or any other card identification value.

Figure 6:
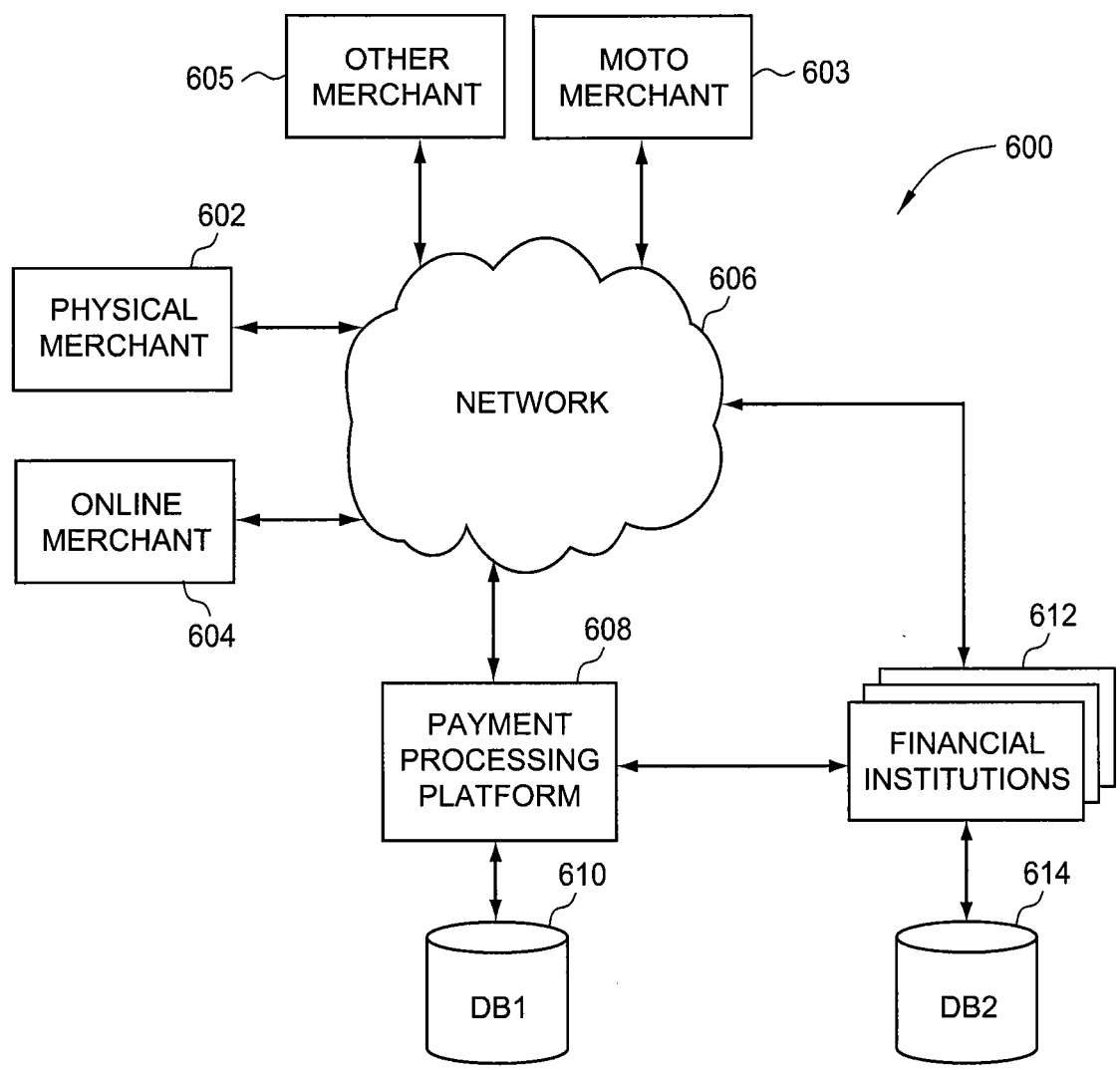
FIG. 6 is a block diagram illustrating components of a system configured to process a child transaction and a core account transaction, according to embodiments of the invention.

FIG. 6 is a block diagram illustrating components of a system 600 configured to process a child transaction and one or more core account transactions, according to embodiments of the invention. As shown, the system 600 includes the physical merchant 602, mail-order telephone orders (MOTO) merchant 603, online merchant 604, other merchant 605, a network 606, a payment processing platform 608, a first database 610, one or more financial institutions 612, and a second database 614.

In one embodiment, a transaction initiated with a child product is known as a "child transaction." In some embodiments, the child product comprises a financial product that is linked to one or more core accounts. As described above, a child product may be delivered in the form of a physical card mailed to a customer or to a recipient. Alternatively, the child product may be delivered electronically as a virtual card. Alternatively, the child product may be delivered both physically as a physical card and electronically as a virtual card. Alternatively, the child product may be delivered to a NFC enabled user device 102. Both the physical card child product and the virtual child card product may be used at any physical merchant 602, MOTO merchant 603, online merchant 604, or other merchant 605 that accepts regular credit cards, debit cards, prepaid cards, and the like. In one embodiment, the physical merchant 602 may be equipped with a RFID terminal to accept a virtual card.

A child transaction may be initiated at the physical merchant 602. For example, a cashier at the physical merchant 602 may swipe the physical child product through a card reader. Alternatively, a child product may be delivered on a user's mobile device and a user at the physical merchant 602 may wave his/her mobile device in front of a contactless card reader. In still further embodiments, the customer may show his/her mobile device to a cashier at the merchant location who manually enters the card number of the child product. Alternatively, the mobile device may include a contactless chip or tag that is wireless readable.

In one embodiment, the network 606 is a card network. In alternative embodiments, the network 606 is an electronic funds transfer (EFT) network. In yet another embodiment, the network 606 is a private network. For example, the child product may be a credit card child product, in which case child transaction information is sent to the appropriate credit card network. Similarly, the child product may be a signature debit card child product, in which case the child transaction information is sent to the appropriate debit card network. In other embodiments, the child product may be a PIN debit card, in which case the child transaction information is sent to the appropriate EFT network. Additionally, the child product may be a private-label card, in which case the child transaction information is sent to the appropriate private network.

In one embodiment, when a child transaction is received by the network 606 and identified as having a BIN number in the range associated with the payment processing platform 608, then the child transaction is routed to the payment processing platform 608. In another embodiment, when a child transaction is received by the network 606 and identified as having a BIN number in the range associated with a financial institution, then the child transaction is routed to the payment processing platform 608.

In another embodiment, when a child transaction is received by the network 606 and identified as having a BIN number in the range associated with the payment processing platform 608, then the child transaction is routed to the financial institution 612. In yet another embodiment, when a child transaction is received by the network 606 and identified as having a BIN number in the range associated with a financial institution, then the child transaction is routed to the financial institution 612. Financial institution 612 then transmits the child transaction to the payment processing platform 608 for processing which in one embodiment works the same as described above. In one embodiment where the child transaction is transmitted from the financial institution 612 to the payment processing platform 608, the core account transaction generated by the payment processing platform 608 is transmitted to the financial institution 612, bypassing the network 606.

When a child transaction is received by the payment processing platform 608, the payment processing platform 608 may then compare the child transaction details with parameters stored for that particular child product in the first database 610. As described above, the comparison may require that each control parameter stored for the child product is satisfied, that a minimum number of control parameters are satisfied, or that a sum of the weights assigned to control parameters that are satisfied exceeds a minimum threshold. In one embodiment, if at least one of the control parameters is not satisfied, then the payment processing platform may return a decline response to the network 606 and the child transaction is denied. If each of the control parameters is satisfied, then the card number of the child product is linked to the one or more of the core accounts to which the child product is linked. Additionally, if the child product comprises a core account with control parameters, then the core account number is already known and mapping may be skipped. Further, in some embodiments, the child product is the same core account that provides financial backing for the child product, in which case the mapping step may be skipped.

In one embodiment, the second database 614 contains the mapping from child product card number to one or more core account numbers associated with the child product, and may be located on the systems of the financial institutions 612. In alternative embodiments, the second database 614 may reside on systems operated by the payment processing platform 608. In yet another embodiment, database 610 and 614 may be combined. In yet another embodiment, the mapping from child product card number to one or more core account numbers associated with the child product may reside on both the first database 610 and the second data base 614. Once the one or more core account numbers are determined, one or more core account transactions are generated and transmitted to the network 606 for normal routing and processing as a core account transactions. Each core account transaction is sent to the respective financial institution that issued the core account. The processing system at the financial institution that issued a particular core account processes the core account transaction in normal fashion and approves or denies the transaction based on a normal set of processing rules. For example, in a particular embodiment, a child account is linked to three core accounts, where the first core account is a checking account, the second core account is a savings account, and the third and core account is a credit card account. Each of the three core accounts is configured to contribute one-third of the overall cost of any transaction that is generated using the child product. When a child product transaction is generated, three individual core account transactions are generated by the payment processing platform 608 for the checking, savings, and credit card accounts, respectively. Each of the individual core account transactions withdrawals one-third of the total child transaction cost from its respective core account. Thus, in this example, subsequent to a completed child transaction, an even distribution of funds is maintained across the linked core accounts.

A similar child transaction may be initiated from an online merchant 604, from a MOTO merchant 603, or from any other merchant 605. In one embodiment, the user may input the child product card number into a payment webpage and an online child transaction is initiated. In another embodiment, the user may submit the child product card number to a customer service representative at a MOTO merchant 603. In yet another embodiment, the user may submit the child product card number in a mail order form to a MOTO merchant 603. A child transaction initiated at a MOTO merchant 603, at an online merchant 604, or at any other merchant 605 may be processed in similar fashion to a child transaction initiated at the physical merchant location 602.

Figure 7:
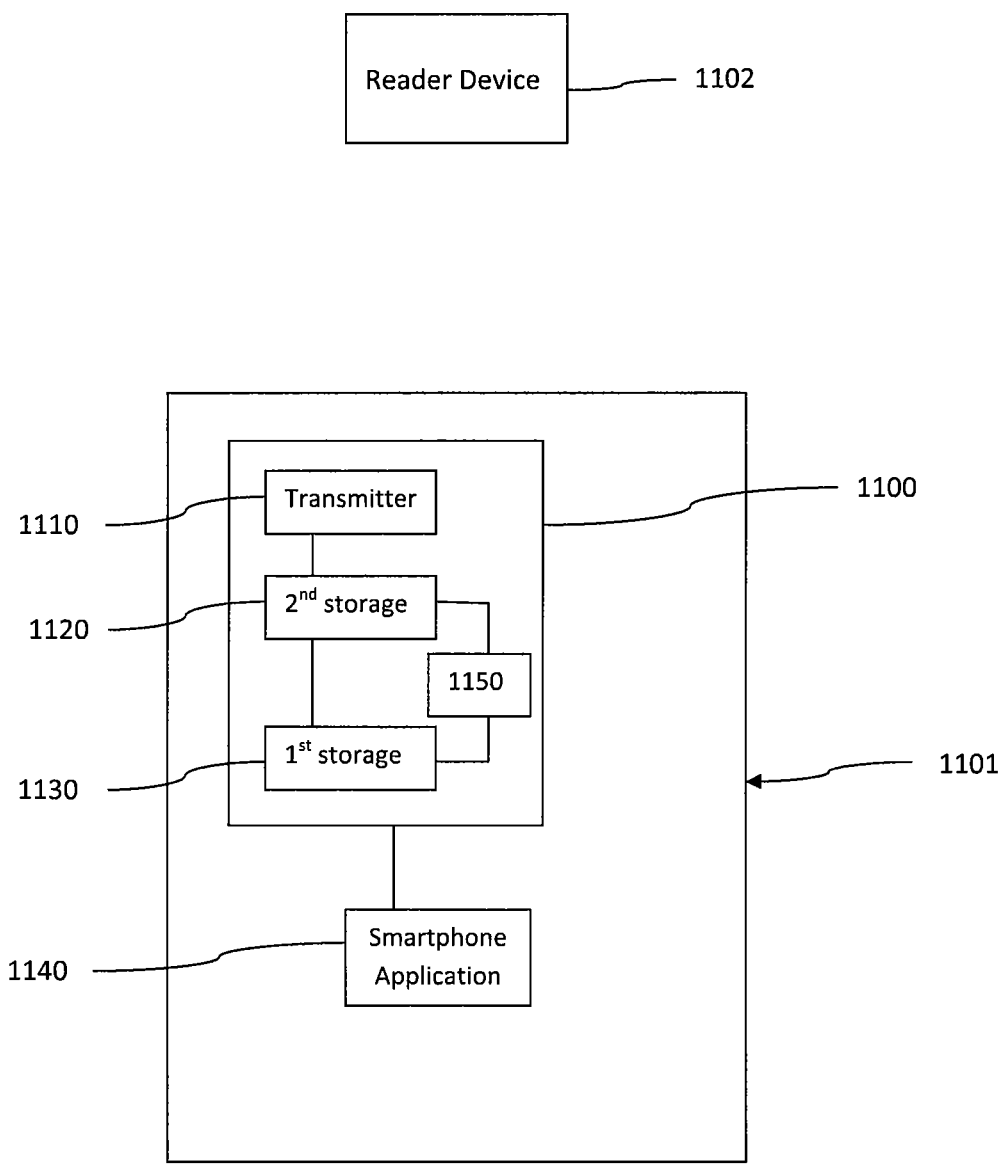
FIG. 7 illustrates a device equipped with a NFC system according to one embodiment of the invention.

FIG. 7 shows an embodiment of a mobile device 1101 configured with a NFC tag 1100 according to one embodiment of the invention. The mobile device 1101 may be configured to communicate with a reader device 1102 using NFC technology. The NFC tag 1100 includes a transmitter 1110 such as an antenna circuit, a first storage device 1130, a second storage device 1120, and a controller 1150. Examples of the transmitter 1110 include a standard RFID antenna and a transceiver circuit for both receiving and sending wireless data. Also, the NFC tag 1100 may be a passive device or an active NFC device having its own power source. Although embodiments herein are described with respect to a mobile device, it is contemplated other suitable devices having a NFC enabled configuration are also contemplated. Exemplary devices include a portable devices such as a laptops or a tablets, a desktop, a NFC enabled credit card, a microprocessor with software, or a dedicated hardware.

The first storage device 1130 is configured to store user personal data, such as financial information related to one or more accounts held with a financial institution including a checking account, a savings account, a home equity line of credit, a money market account, a credit card account, a debit card account, a prepaid card account, a gift card account, a healthcare savings account, an educational savings account, an employee benefits account, a promotion fund account, a rewards account (e.g., mileage or rewards points), a child product, and combinations thereof. It should be appreciated that such personal data may be transferred to the first storage device 1130 using either a wired interface (not shown), via antenna circuit, or manual input, through a logic that receives that information through another channel, e.g., a Smart Phone application that uses the cell phone network or the internet to receive the information through a server or a hardware device that performing a similar function such as from the payment processing platform or from the financial institution. The first storage device 1130 is configured to prevent access by the NFC reader device 1102. In another embodiment, the first storage device 1130 may be an external storage device connected to the NFC tag 1100. Exemplary embodiments of the first storage device include non-volatile memory, volatile memory, and disks. Examples of non-volatile memory include flash memory, non-volatile random access memory (NVRAM), Electronically Erasable Programmable Read-Only Memory (EEPROM), and combinations thereof. In yet another embodiment, a logic could directly write to the second storage device.

The second storage device 1120 may be configured for access by the reader device 1102. In one embodiment, the second storage device 1120 is a passive memory that is activatable by the reader device 1102. The second storage device 1120 may be a volatile memory that is configured to erase data stored therein upon powering off after a predetermined amount of time. The second storage device 1120 may receive data from the first storage device 1130 and thereafter transfer the data to the reader device 1102 via NFC. In another embodiment, the second storage device 1120 may be a non-volatile memory or a disk. The logic may be a smart phone application that uses the cell phone network or the internet to receive the information through a server such as the payment processing platform and writes to the second storage device or a hardware device that performing a similar function.

The controller 1150 may include a near field communication controller such as a processor, a special purpose state device, or any other appropriate controller. The near field communication controller may be configured to control the transmission of data between the reader device 1101, the second storage device 1120, and the first storage device 1130. In another embodiment, the controller 1150 of the NFC tag 1100 may be an external controller such as a controller for the mobile device. In yet another embodiment the controller 1150 may include the logic and connectivity to other channels such as the Internet. In one embodiment, the decision to initiate transfer of data from the first storage device 1130 to the second storage device 1120 may be controlled using a smartphone application 1140. Optionally, an authentication process such as entering a PIN in the smart phone application may be required prior to transferring the data. The user may download and install the smartphone application 1140 from an application store. In addition to a smart phone application, other types of logic, including software and hardware, may be used to control the process. In yet another example, the controller 1150 may be a reduced instruction set computer (RISC), such as an 8-, 16- or 32-bit RISC CPU or a dedicated fixed function hardware.

The reader device 1102 may be a NFC reader device which emits electromagnetic energy capable of powering up or activating the NFC tag 1100. The electromagnetic energy may be employed to wake up the NFC devices which do not have built-in power supplies, for example, the second storage device 1120. In the embodiment of FIG. 7, the NFC tag 1100 is outside the range of the electromagnetic energy, and thus is not being activated by the reader device 1102.

Figure 8:
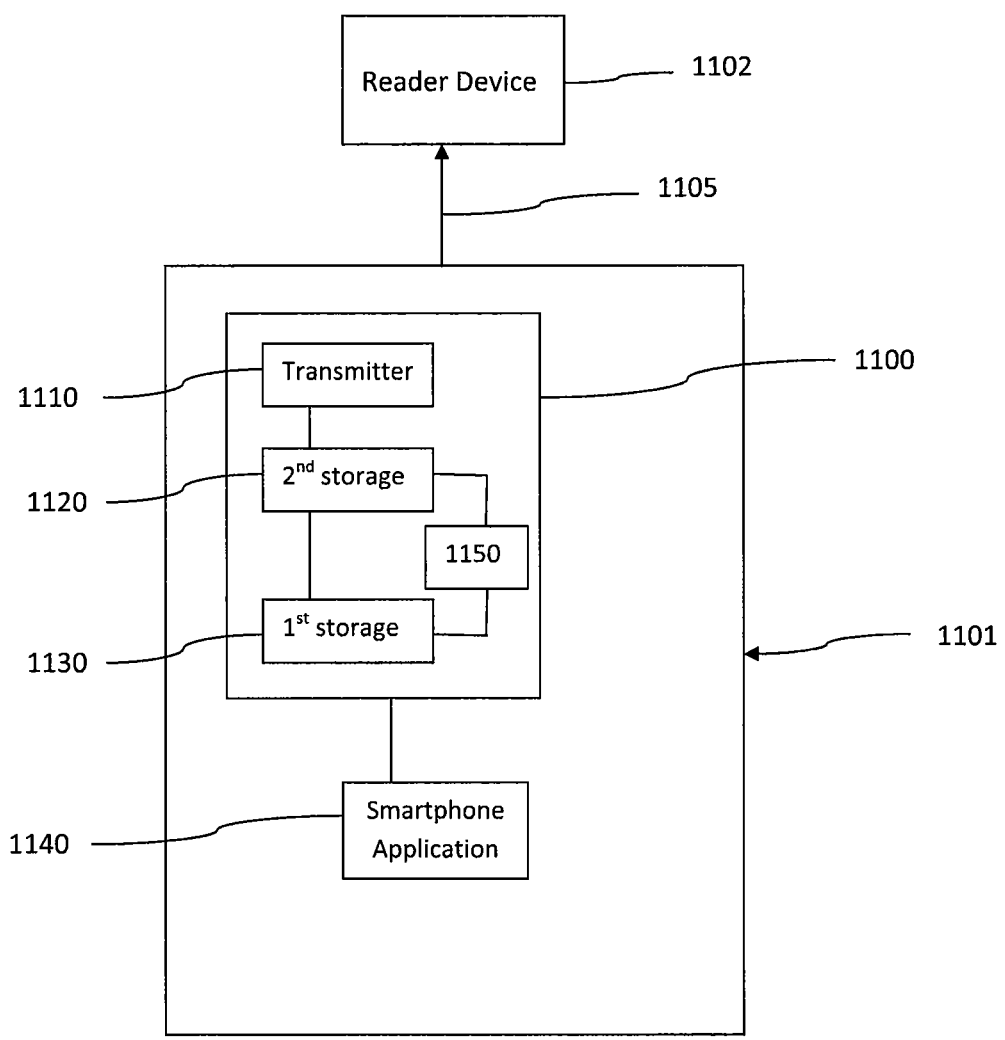
FIG. 8 illustrates NFC system of the device of FIG. 8 in communication with a reader device.

FIG. 8 shows the device 1101 after the NFC tag 1100 has come within range of the electromagnetic energy of the reader device 1102. Once the NFC tag 1100 has been powered up by the electromagnetic energy, it may automatically transmit data stored in the second storage device 1120 in the form of a NFC signal 1115. However, as will be described below, the second storage device 1120 will not contain the data until it has received the data from the first storage device 1130 just before the NFC communication. In one embodiment, the electromagnetic energy from the reader device 1102 may be used as a trigger for the controller 1150 to initiate transfer of data to the second storage device 1120 and/or to begin an authentication process such as entering a PIN to initiate a payment transaction. In another embodiment, an authentication or validation process may precede the transmission of the personal data from the first storage device 1130 to the second storage device 1120.

In one embodiment, the NFC signal 1115 has a frequency of 13.56 Mhz and transmits data at 106, 212, or 424 kbps. In addition, NFC signal 1115 will have a limited effective distance in the range of between approximately 2 cm and 1101 cm. In certain embodiments, NFC signal 1115 may conform to the ISO/IEC 18092 standard.

Figure 9:
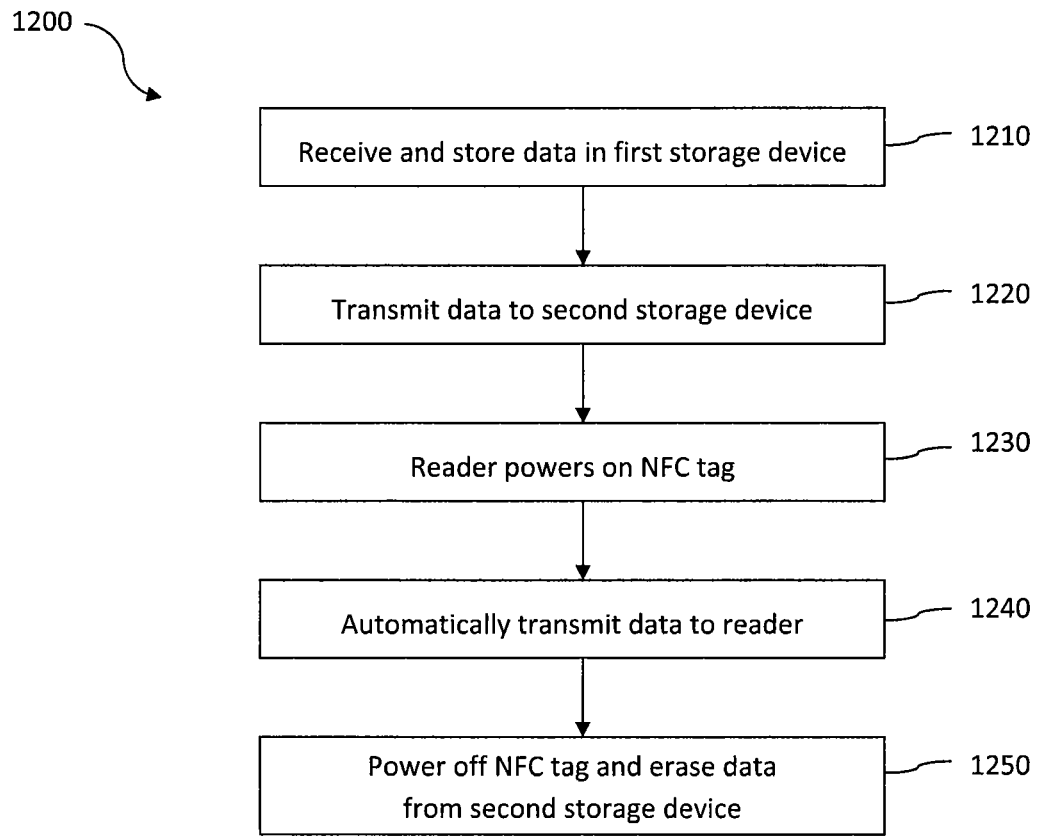
FIG. 9 is a flow diagram of method steps of a NFC communication between a device and a reader device according to one embodiment of the invention.

FIG. 9 is a method 200 for implementing one embodiment of the present invention. The method 200 relates to a data communication to be completed using the NFC capability of a mobile device 1101. Persons skilled in the art will understand that, even though the method 200 is described in conjunction with the systems of FIGS. 7 and 8, any system configured to perform the steps of the method 1200 illustrated in FIG. 9, in any order, is within the scope of the present invention. In one embodiment, one or more steps of the method 1200 may be optional.

As shown, the process 1200 begins when an NFC tag 1100 receives user personal data such as a child product containing credit card information. At step 1210, the user personal data is stored in a first storage device 1130 such as a non-volatile memory not activatable by the reader device 1102. In one embodiment, storing the personal data may require a user password and/or key, as is generally known in the art. In another embodiment, the personal data may come pre-configured from the issuer or issuer processor and stored in the first storage device. In another embodiment, the NFC tag 110 may receive and store a plurality of personal data. The plurality of personal data may be used sequentially or randomly selected by the user. If the personal data are limited to a single use, the plurality of personal data allows the user to make multiple transactions without making a request for more personal data to be delivered to the NFC tag 100. After the transactions, the NFC tag 100 may make a request to obtain more personal data to restore the number of personal data saved in the first storage device.

At step 1220, the personal data may be transferred from the first storage device 1130 to the second storage device 1120, which may be volatile memory, just before the NFC communication. The user may access the smartphone application 1140 or other types of logic to authorize transfer of the personal data. In one embodiment, the transfer may require authentication such as entering a PIN number. The personal data is temporarily stored in the second storage device 1120 for a predetermined period of time.

At step 1230, the NFC tag 1100 may be powered on in response to receiving the electromagnetic energy emitted by the NFC reader device 1102. In another embodiment, powering on of the NFC tag 1100 may trigger the smartphone application 1140 to request the user to authorize transfer of personal data from the first storage device 1130 to the second storage device 1130. In this respect, step 220 and step 230 may be performed in reverse order.

After activation, at step 1240, the NFC tag 1100 automatically accesses the second storage device 1120 and transmits the stored personal data to the reader device 1102.

At step 1250, after transmission of the personal data, the NFC tag powers off after a predetermined period of time. In one embodiment, the second storage device is volatile memory, thus the personal data is removed after the NFC tag powers down after each transaction or use. In this respect, the personal data is not available for eavesdropping by unauthorized reader devices. In another embodiment, if the second storage device 1120 is a non-volatile memory, the controller 1150 may erase the personal data from the second storage device 1120 after communicating the data to the reader device 1102.

Figure 10:
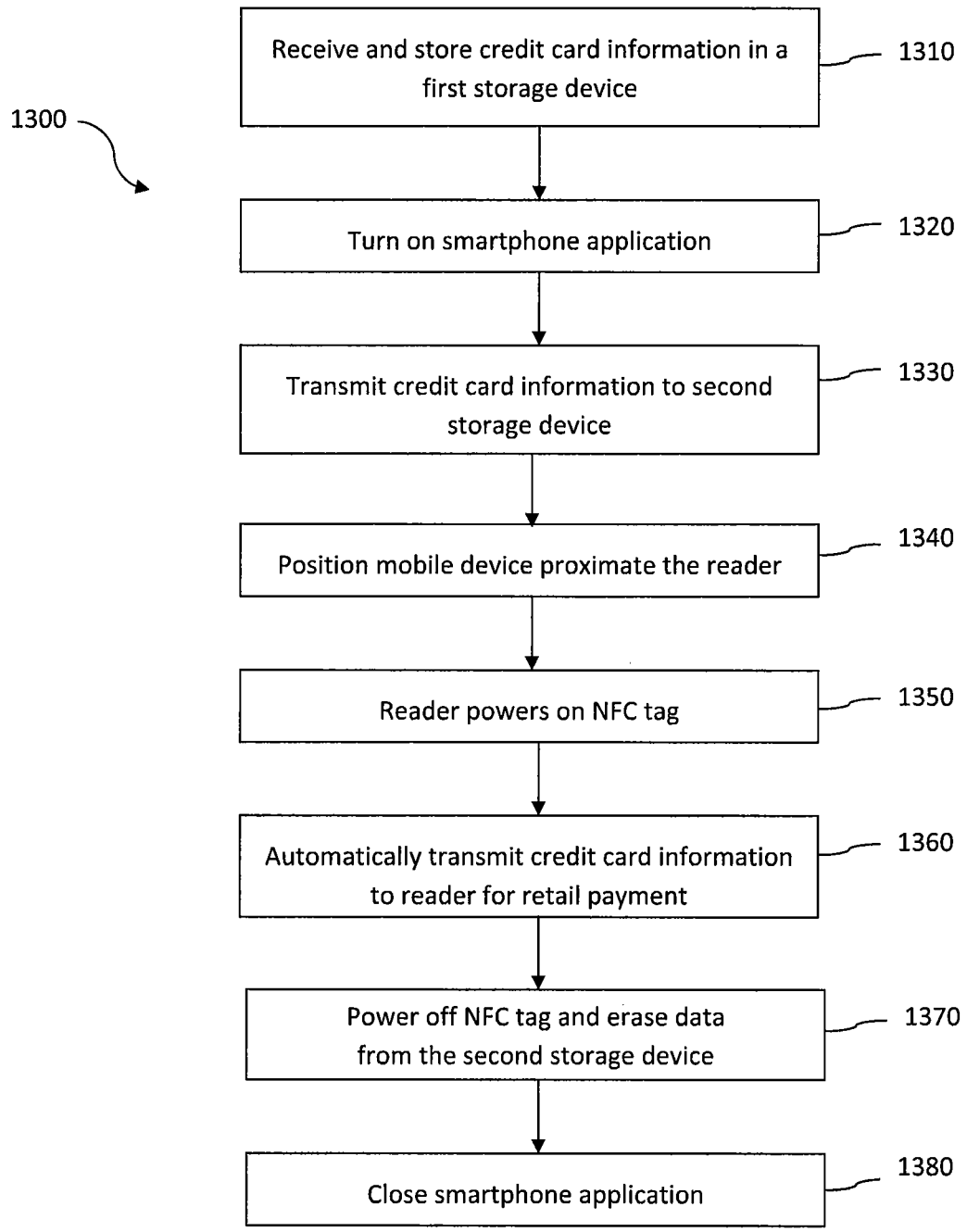
FIG. 10 is a flow diagram of method steps of a payment transaction using a device with NFC capability according to one embodiment of the invention.

FIG. 10 is another method 1300 for implementing one embodiment of the present invention. The method 1300 relates to a retail transaction to be completed using the NFC capability of a mobile device 1101. Persons skilled in the art will understand that, even though the method 1300 is described in conjunction with the systems of FIGS. 7 and 8, any system configured to perform the steps of the method 1300 illustrated in FIG. 10, in any order, is within the scope of the present invention. In one embodiment, one or more steps of the method 1300 may be optional.

As shown, the process 1300 begins when an NFC tag 1100 receives user personal data. In one embodiment, the personal data is a child product or multiple child products containing credit card information. At step 1310, the credit card information is stored in a first storage device 1130 not activatable by the reader device 1102. In one embodiment, the first storage device 1130 may be a non-volatile memory. In another embodiment, storing the credit card information may require a user password and/or key, as is generally known in the art.

At step 1320, during a retail payment transaction, the user may turn on a smartphone application 1140 in the mobile device 1101 to initiate transmission of the credit card information from the first storage device 1130 to the second storage device 1120.

At step 1330, the credit card information is transmitted from the first storage device 1130 to the second storage device 1120 just prior to NFC communication with the NFC reader device 1102. The credit card information is stored in the second storage device 1120 for an amount of time sufficient to complete the transaction.

At step 1340, the mobile device 1101 is positioned in close proximity to the NFC reader device 1102 to allow NFC communication between the reader device 1102 and the mobile device 1101.

At step 1350, the NFC tag 1100 may be powered on in response to receiving the electromagnetic energy emitted by the reader device 1102. In another embodiment, powering on of the NFC tag 1100 may trigger the smartphone application 1140 to request the user to approve transfer of credit card information from the first storage device 1130 to the second storage device 1130. In this respect, step 1350 may be performed before step 1320.

After activation, at step 1360, the NFC tag 1100 automatically accesses the second storage device 1120 and transmits the stored credit card information to the reader device 1102 for retail payment.

At step 1370, after transmission of the credit card information, the NFC tag 1100 powers off after a predetermined period of time. If the second storage device 1120 is a volatile memory, the credit card information is removed after the NFC tag 1100 powers down after the payment transaction. If the second storage device 1120 is a non-volatile memory, the smartphone application 1140 may be configured to erase the credit card information from the second storage device 1120 after the payment transaction. In this respect, the credit card information is not available on the second storage device 1120 for eavesdropping by unauthorized reader devices.

At step 1380, the smartphone application is closed.

Figure 11:
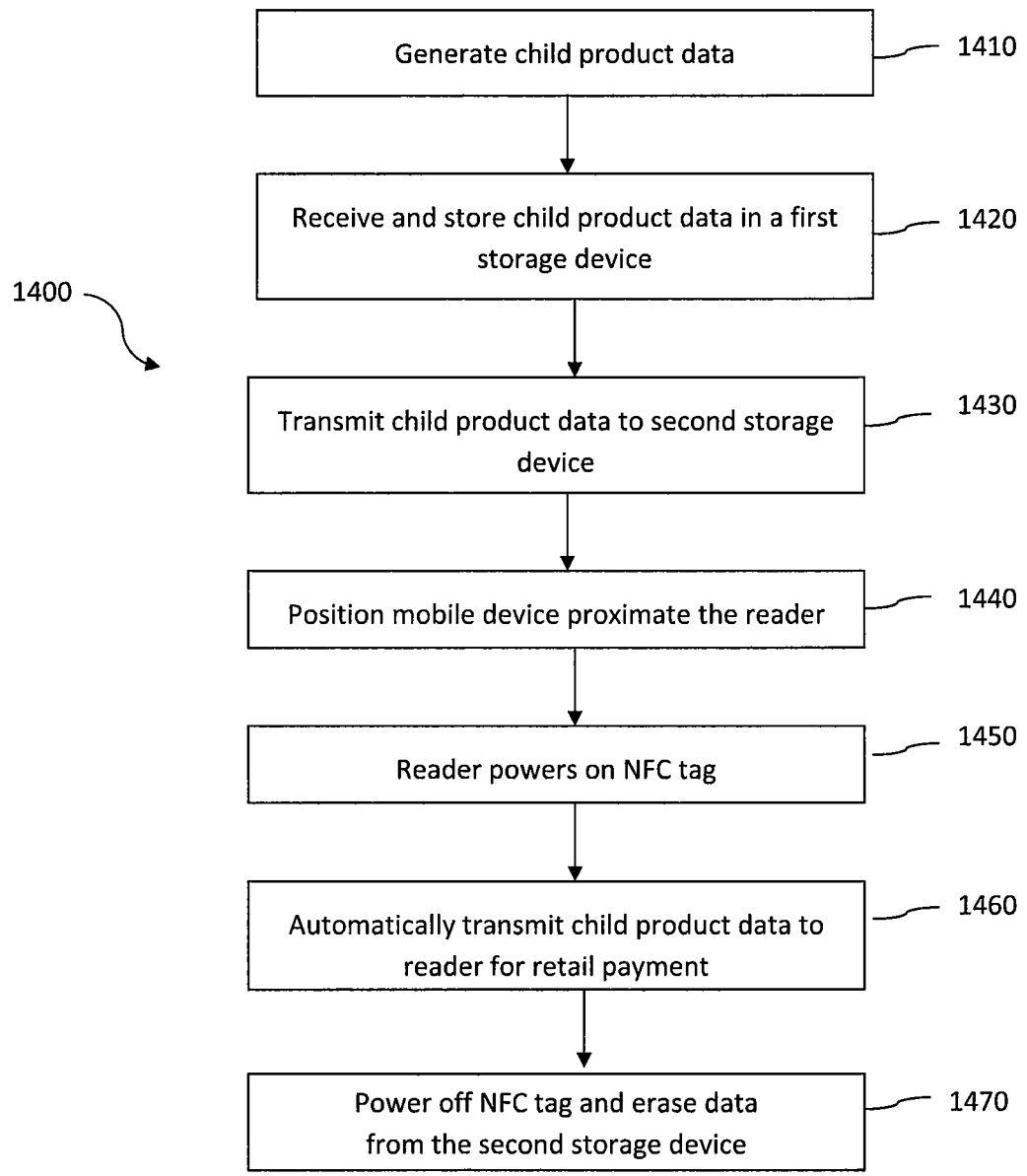
FIG. 11 is a flow diagram of method steps of a payment transaction using a device with NFC capability and a child product data according to one embodiment of the invention.

FIG. 11 is another method 1400 for implementing one embodiment of the present invention. The method 1400 relates to a retail transaction to be completed using the NFC capability of a mobile device 1101. Persons skilled in the art will understand that, even though the method 1400 is described in conjunction with the systems of FIGS. 7 and 8, any system configured to perform the steps of the method 1400 illustrated in FIG. 11, in any order, is within the scope of the present invention. In one embodiment, one or more steps of the method 1400 may be optional. Although this embodiment is described using a mobile device, other suitable NFC enabled devices are within the scope of the present invention.

As shown, the process 1400 begins by generating a child product data, such as in accordance with FIG. 3 above. The child product data may contain debit or credit card information for the retail transaction. The child product data is then delivered to the NFC tag 1100. In one embodiment the child product data is transmitted to NFC tag 100. In another embodiment, the child product data is transferred to the NFC tag 100 through a cable such as a USB cable.

At step 1420, the child product data is stored in a first storage device 1130 not activatable by the reader device 1102. In one embodiment, child product data is pre-stored on the first storage device 1130. In another embodiment, the child product data is transmitted from a network and stored on the first storage device 1130 just prior to the transaction. The child product data may be pushed to the device 1101 or pulled by the device 1101. In yet another embodiment, multiple child product data may be stored on the device 1101 to conduct one or more transactions. In one embodiment, the first storage device 1130 may be a non-volatile memory. In another embodiment, storing the child product data may require a user password and/or key. Optionally, the child product data may be encrypted when stored in the first storage device 1130.

At step 1430, during a retail payment transaction, the user may initiate transmission of the child product data from the first storage device 1130 to the second storage device 1120. For example, the user may turn on a smartphone application 1140 in the mobile device 1101 to begin transmission. In another embodiment, the child product data is obtained from a network after the smartphone application 1140 is turned on. In one embodiment, the device 1101 may allow the user to select from a plurality of available child products. If encrypted, the child product data may be decrypted prior to transmission. The child product data is transmitted from the first storage device 1130 to the second storage device 1120 just prior to NFC communication with the NFC reader device 1102. The child product data is stored in the second storage device 1120 for an amount of time sufficient to complete the transaction.

At step 1440, the mobile device 1101 is positioned in close proximity to the NFC reader device 1102 to allow NFC communication between the reader device 1102 and the mobile device 1101.

At step 1450, the NFC tag 1100 may be powered on in response to receiving the electromagnetic energy emitted by the reader device 1102. In another embodiment, powering on of the NFC tag 1100 may optionally trigger the device to request the user to approve transfer of a child product data from the first storage device 1130 to the second storage device 1130. In this respect, steps 1440 and/or 1450 may be performed before step 1430.

After activation, at step 1460, the NFC tag 1100 automatically accesses the second storage device 1120 and transmits the stored child product data to the reader device 1102 for retail payment.

At step 1470, after transmission of the child product data, the NFC tag 1100 powers off after a predetermined period of time. If the child product data is configured for single use, the child product data would no longer be valid for further transactions. If the second storage device 1120 is a volatile memory, the child product data is removed after the NFC tag 1100 powers down after the payment transaction. If the second storage device 1120 is a non-volatile memory, the smartphone application 1140 may optionally be configured to erase the child product data from the second storage device 1120 after the payment transaction. In this respect, the child product data is not available on the second storage device 1120 for eavesdropping by unauthorized reader devices. In another embodiment, the child product data may be erased from the first storage device 1130. If used, the smartphone application is closed after transmission.

Figure 12:
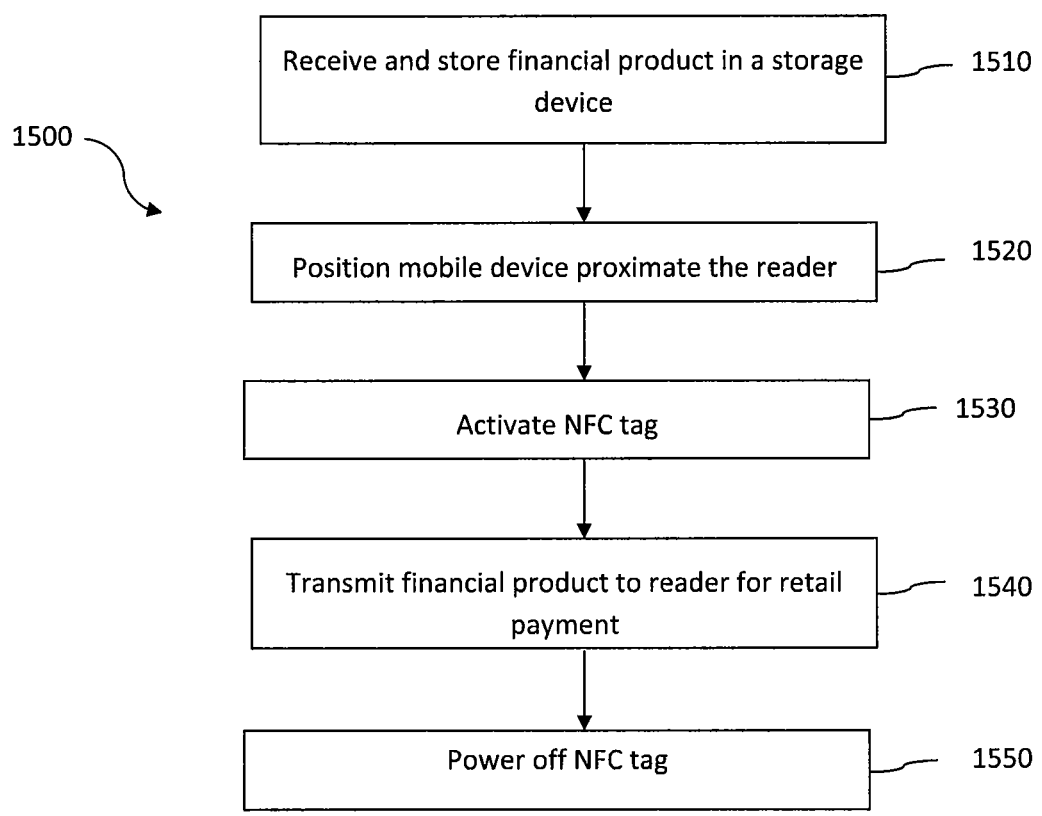
FIG. 12 is a flow diagram of method steps of a payment transaction using a device with NFC capability and a child product data according to one embodiment of the invention.

In another embodiment, a NFC enabled device may use only one storage device. FIG. 12 illustrates another exemplary process 1500 of conducting a retail transaction using a financial product such as a credit card, debit card, prepaid card, a child product, or combinations thereof. The child product data may contain debit or credit card information for use in the retail transaction and can be mapped to an underlying core account such as a credit card account. At step 1510, the financial product is delivered to the NFC tag 1100. For example, a child product containing credit card information may be delivered to the NFC tag 1100. In one embodiment the financial product is transmitted to NFC tag 1100 using a wireless network. In another embodiment, the financial product is transferred to the NFC tag 1100 through a cable such as a USB cable. In one embodiment, one or more steps of the method 1500 may be optional.

The financial product may be stored in a storage device. In one embodiment, the financial product is pre-stored on the storage device. In another embodiment, the financial product is transmitted through a network and stored on the storage device just prior to the transaction. For example, the user may turn on a logic such as a smartphone application to obtain the financial product. The financial product may be pushed to the device 1101 or pulled by the device 1101. In yet another embodiment, multiple financial products may be stored on the device 1101 to conduct one or more transactions. In one embodiment, the storage device may be a non-volatile memory or a volatile memory. In another embodiment, storing the financial product may require a user password and/or key. Optionally, the financial product may be encrypted when stored in the storage device. In another embodiment, the storage device is prevented from activation by the reader device 1102.

At step 1520, the mobile device 1101 is positioned in close proximity to the NFC reader device 1102 to allow NFC communication between the reader device 1102 and the mobile device 1101.

At step 1530, the NFC tag 1100 may be powered on in response to receiving the electromagnetic energy emitted by the reader device 1102. In another embodiment, the user may turn on a smartphone application or other logic prior to communication with the reader device 1102. After activation, the device 1101 may select a financial product for the payment transaction or optionally allow the user to select from a plurality of available child products. In yet another embodiment, activation of the NFC tag 1100 initiates a request for a financial product from a network. For example, if the child product data is configured for single use, the NFC tag 1100 may be configured to obtain a new child product each time the NFC tag 1100 is activated.

After activation, at step 1540, the NFC tag 1100 automatically accesses the storage device and transmits the stored financial product to the reader device 1102 for retail payment. If encrypted, the financial product may be decrypted prior to transmission. If a child product is used, the real account information would not be exposed to the payee.

At step 1550, after transmission of the financial product, the NFC tag 1100 powers off after a predetermined period of time. If the child product data is configured for single use, the child product data would no longer be valid for further transactions. In another embodiment, the financial product may be re-encrypted and saved. If used, the smart phone application is closed after transmission.

In yet another embodiment, the financial product such as a credit card, debit card, prepaid card, a child product, and combinations thereof may be stored in a storage device as separate components. The separate components are linked together by a controller to form a valid financial or product data just prior to the transaction.

Although some of the embodiments are described using a mobile device, other suitable NFC enabled devices are within the scope of the present invention.

In another embodiment, a device for use with a reader device includes an NFC tag having a first storage device for storing data; a second storage device; and a controller coupled to the first storage device and the second storage device. In one embodiment, the controller is configured to transmit data from the first storage device to the second storage device; and transmit data from the second storage device to the reader device.

In one or more of the embodiments described herein, the NFC tag is one a passive device or an active device.

In one or more of the embodiments described herein, the controller is further configured to remove data from the second storage device.

In one or more of the embodiments described herein, the data is stored in an encrypted form.

In one or more of the embodiments described herein, the first storage device comprises non-volatile memory, volatile memory, and disk.

In one or more of the embodiments described herein, the controller is further configured to power on the NFC tag in response to an electromagnetic energy from the reader device.

In one or more of the embodiments described herein, the data contains one or more credit card information for a payment transaction.

In another embodiment, a method of transmitting a financial product data from a NFC enabled device to a reader device includes receiving the financial product data; storing the financial product data in a storage device; and transmitting the financial product data from the storage device to the reader device.

In one or more of the embodiments described herein, the financial product data is received each time the NFC enabled device is activated.

In one or more of the embodiments described herein, the method includes storing a plurality of financial product data on the storage device.

In one or more of the embodiments described herein, the method includes choosing one financial product data to be transmitted.

In one or more of the embodiments described herein, the method includes removing the financial product data from the storage device.

In one or more of the embodiments described herein, the financial product data is stored in an encrypted format, and the method further comprises de-encrypting the financial product data prior to transmitting to the reader device.

In one or more of the embodiments described herein, the financial product data is a single use financial product data.

In one or more of the embodiments described herein, the method includes after transmitting the financial product data, receiving a second financial data, and storing the second financial data in the storage device.

In one or more of the embodiments described herein, the financial product data comprises a child product.

In another embodiment, a method of transmitting data from a device equipped with a NFC tag to a reader device includes storing data in a first storage device; transmitting data from first storage device to a second storage device; activating the NFC tag in response to an electromagnetic signal from the reader device; and transmitting the data from the second storage device to the reader device.

In one or more of the embodiments described herein, the method includes accessing a smartphone application to initiate transmission of data from the first storage device.

In one or more of the embodiments described herein, the data is obtained via a network.

In one or more of the embodiments described herein, the data comprises one or more financial child products.

In one or more of the embodiments described herein, funding for the financial child product is provided by one or more core accounts.

In one or more of the embodiments described herein, the method includes removing the financial child product from the second storage device.

In one or more of the embodiments described herein, the financial child product is configured for single use.

In one or more of the embodiments described herein, the method includes obtaining a financial child product via a network for each transmission to the reader device.

In one or more of the embodiments described herein, wherein a plurality of financial child product is stored in the first storage device.

In one or more of the embodiments described herein, wherein transmitting the data from first storage device occurs after activating the NFC tag.

In one or more of the embodiments described herein, wherein the data is automatically removed from the second storage device when the NFC tag is deactivated.

In one or more of the embodiments described herein, the method includes removing the data from the second storage device.

In another embodiment, a computer-implemented method for transmitting data from a mobile device to a reader device using NFC technology includes receiving a signal from the reader device; prompting a user to produce a response indicating whether to transmit data from a first storage device to a second storage device; transmitting data from the first storage device to the second storage device if the response is affirmative; and causing the data to be transmitted from the second storage device to the reader device.

In one or more of the embodiments described herein, the method includes causing the data on the second storage device to be erased after transmission to the reader device.

In another embodiment, a method of performing a payment transaction between a payor and a payee, wherein the payor uses a payment device equipped with a NFC tag and the payee uses a reader device, includes activating the NFC tag in response to a signal from the reader device; transmitting the financial product from a first storage device of the payment device to a second storage device of the payment device; and transmitting the financial product from the second storage device to the reader device.

In one or more of the embodiments described herein, the information on the first storage device is prevented from transmission to the reader device.

In one or more of the embodiments described herein, the financial product is obtained via a network.

In one or more of the embodiments described herein, the method includes removing the financial product from the second storage device.

In one or more of the embodiments described herein, the method includes storing the financial product in the first storage device prior to transmission to the second storage device.

In one or more of the embodiments described herein, the financial product is stored a plurality of components, and the method further includes linking the plurality of components to form a valid financial product before transmission to the second storage device.

While the foregoing is directed to embodiments of the invention, other and further embodiments of the invention may be devised without departing from the basic scope thereof, and the scope thereof is determined by the claims that follow.

I claim:

1. A method of transmitting a financial product data from a NFC enabled device to a reader device for a payment transaction, comprising:
receiving, at the NFC enabled device, the financial product data;
storing the financial product data in a first storage device of the NFC enabled device, wherein the first storage device is not activatable and not accessible by the reader device;
during the payment transaction, transmitting the financial product data from the first storage device to a second storage device of the NFC enabled device, wherein the second storage device is activatable and accessible by the reader device;
transmitting the financial product data from the second storage device to the reader device; and
removing the financial product data from the second storage device after transmission to the reader device.

2. The method of claim 1, wherein the financial product data is received each time the NFC enabled device is activated.

3. The method of claim 1, wherein the financial product data is stored in an encrypted format, and the method further comprises de-encrypting the financial product data prior to transmitting to the reader device.

4. The method of claim 1, further comprising after transmitting the financial product data, receiving a second financial data, and storing the second financial data in the first storage device.

5. The method of claim 1, wherein the financial product data comprises a child product.

6. The method of claim 1, further comprising accessing a smartphone application to initiate transmission of the financial product data from the first storage device to the second storage device.

7. The method of claim 1, wherein the financial product data is configured for single use.

8. The method of claim 1, further comprising obtaining the financial product data via a network for each transmission to the reader device.

9. The method of claim 1, further comprising activating a NFC tag to transmit the financial product data from the first storage device to the second storage device.

10. The method of claim 9, wherein the financial product data is automatically removed from the second storage device when the NFC tag is deactivated.

11. The method of claim 1, further comprising storing a plurality of financial product data on the first storage device.

12. The method of claim 11, further comprising choosing one financial product data to be transmitted.

13. The method of claim 1, further comprising removing the financial product data from the storage device.

14. The method of claim 1, wherein funding for the financial child product is provided by one or more core accounts.

* * * * *